May 28, 1940.   R. A. GEUDER   2,202,419
INDUCTION MOTOR CONTROL SYSTEM
Filed Nov. 10, 1938
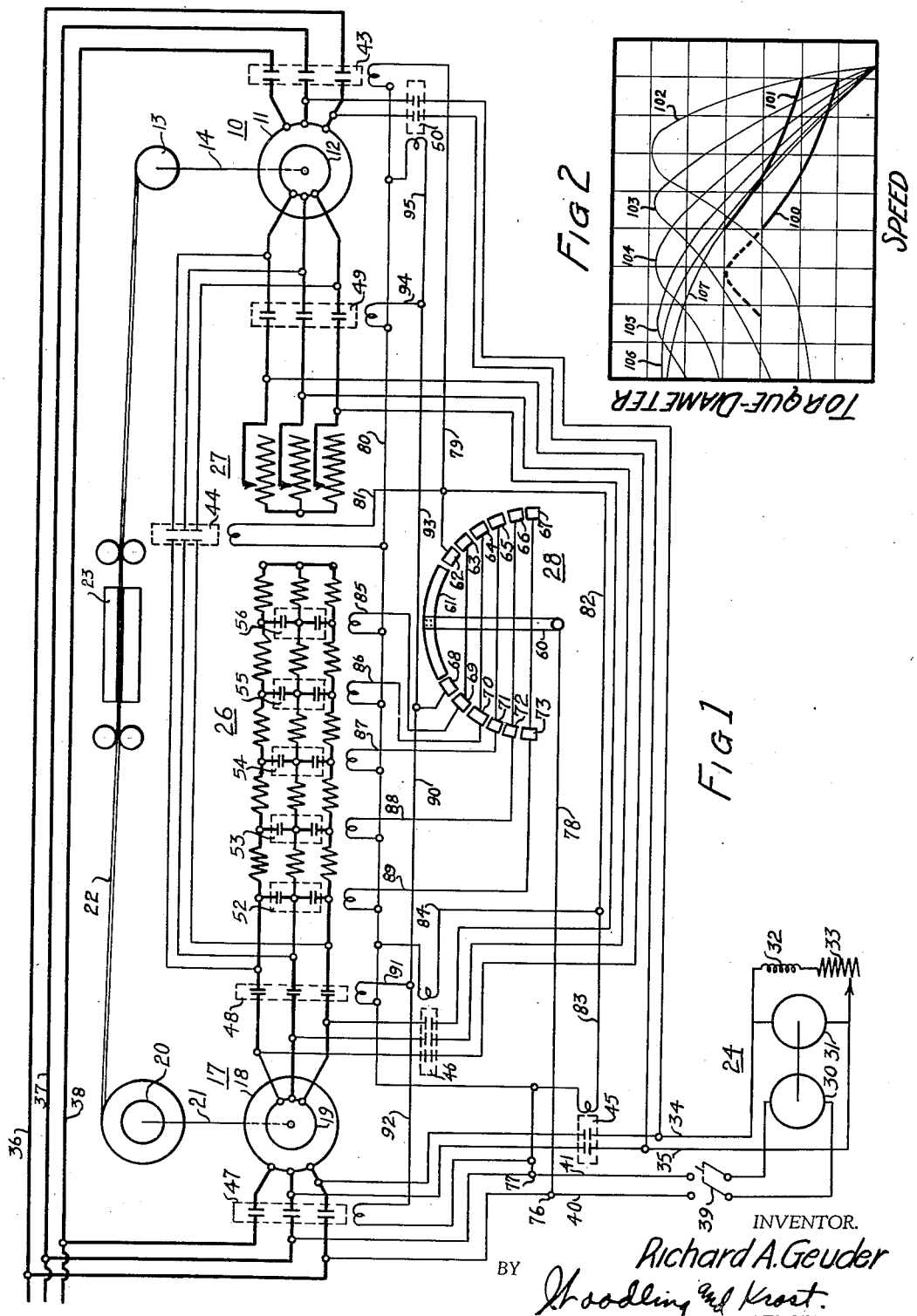
INVENTOR.
Richard A. Geuder
BY
Woodling and Krost.
ATTORNEY.

Patented May 28, 1940

2,202,419

UNITED STATES PATENT OFFICE 2,202,419

INDUCTION MOTOR CONTROL SYSTEM

Richard A. Geuder, Cleveland, Ohio, assignor to Reliance Electric and Engineering Company, a corporation of Ohio Application November 10, 1938, Serial No. 239,809

5 Claims. (Cl. 242—75)

My invention relates, in general, to motor control systems, and more particularly to induction motor control systems for transferring material from either of two rotatively mounted members to the other.

My invention is diagrammatically illustrated in combination with a pair of reels on either side of a processing device through which the material being transferred from one reel to the other must pass. Although my invention is capable of general application, it is particularly useful for transferring a coiled strip of steel from one reel to another while passing same through a processing device to polish the surface of the steel. When the coiled strip of steel is passed through the processing device in one direction, the direction of travel is reversed and then it is rewound upon the original reel. This cycle of operation is continued until the steel strip is properly finished.

An object of my invention is to provide for transferring material from either of two reels to the other at a substantially constant speed and tension, as the effective diameters of the reels vary.

Another object of my invention is to provide for reversibly operating a pair of induction motors as a motor and a drag generator, and as a drag generator and a motor, respectively, and for causing the drag generator to produce a braking-torque characteristic which varies approximately inversely with the speed of the unwinding reel to maintain substantially uniform tension on the material being unwound and for causing the induction motor when acting as a motor to decrease its speed as the driving torque increases resulting from effective increase in the diameter of the winding reel.

Another object of my invention is to provide for reversely operating an induction motor as a motor and as a drag generator, and for causing the induction motor when acting as a motor to decrease its speed as the driving torque increases resulting from an effective increase in the diameter of the winding reel and for causing the induction motor when acting as a drag generator to decrease its braking torque as the speed of the unwinding reel increases resulting from an effective decrease in the diameter of the unwinding reel.

Another object of my invention is to provide for operating an induction motor as a drag generator and for producing a braking-torque characteristic which varies approximately inversely with the speed of the drag generator.

Another object of my invention is to provide for balancing the direct current excitation of the stator of an induction motor with the selection of the rotor resistance to produce a braking-torque characteristic which compensates for the effective decreasing diameter of an unwinding reel.

Other objects and a fuller understanding of my invention may be had by referring to the following description and claims, taken in conjunction with the accompanying drawing, in which:

Figure 1 is a diagrammatic illustration of a control system embodying the features of my invention; and Figure 2 is a group of curves showing the performance of my control system.

With reference to the drawing, my control system comprises, in general, an induction motor 10 having a stator 11 and a rotor 12 suitably connected to a reel 13 by means of a shaft 14, an induction motor 17 having a stator 18 and a rotor 19 suitably connected to a reel 20 by means of a shaft 21, a plurality of groups of resistance units 26, a bank of adjustable resistance units 27, a segmental controller 28, and a motor-generator set 24.

In the embodiment of my invention, the induction motors 10 and 17 are arranged to be reversibly operated as a motor and as a drag generator, and as a drag generator and as a motor, respectively, to transfer a material 22 from either one of the two reels 13 and 20 to the other. The material 22 as it is transferred from either of the two reels to the other is passed through a processing device 23 for finishing the material. The processing device 23 may be one of any number of devices, and may comprise a device for finishing the surface of a coiled strip of steel as the steel passes therethrough. In actual practice, the processing device may comprise a series of surfacing pads having sand paper or other suitable material arranged to polish the coiled strip as it is transferred from either of the two reels to the other. While I have described my invention briefly in connection with a processing device for finishing the surface of a steel strip, it is to be understood that my control system applies equally well to other types of processing devices.

When the reel 13 is acting as a winding reel and the reel 20 is acting as an unwinding reel, the induction motor 10 is operating as a motor and the induction motor 17 is operating as a drag generator. When the induction motor 10 is operating as a motor and the induction motor 17 is operating as a drag generator, the effective diameter of the reel 13 is gradually increasing and the effective diameter of the reel 20 is gradually decreasing. In the practice of my invention under the above assumed condition, I provide for governing the induction motor 10 to give an increasing torque which compensates for the effective increase in the diameter of the winding reel, and thereby cause the material 22 to travel at a substantially constant transfer speed. At the same time, the induction motor 17, which is acting as a drag generator, is operated to give a braking-torque characteristic which varies substantially in accordance with the effective decreasing diameter of the unwinding reel 20.

In order to increase the torque of the inductance motor 10 and at the same time decrease the speed thereof to compensate for the effective increase in diameter of the winding reel 13, I arrange for connecting the rotor 12 of the induction motor 10, when acting as a motor, in circuit relation with the plurality of groups of resistance units 26. The plurality of groups of resistance units 26 are arranged to be progressively inserted step-by-step in the rotor circuit by means of the segmental controller 28.

The induction motor 17, when acting as a drag generator, is arranged to give a braking torque characteristic which varies approximately inversely with the increase in speed of the unwinding reel 20. To accomplish this, I arrange for exciting the stator 18 by direct current from the conductors 34 and 35 supplied by the generator 31 of the motor-generator set 24, and for connecting the rotor 19 of the induction motor 17 with the adjustable bank of resistance units 27. The characteristic of the braking torque of the induction motor 17, when acting as a drag generator, is determined by balancing the direct current excitation of the stator with the selection of the proper amount of resistance 27. With reference to Figure 2, a proper balance of the direct current excitation of the stator with the adjustable resistance of the rotor will produce a speed-torque curve 100 which substantially parallels the curve 101 which represents the ever-decreasing effective diameter of the unwinding reel with respect to the speed of the reel. The vertical distance between the two curves 100 and 101 represents the value of the drag upon the material 22 as it passes through the processing device 23. The direct current excitation of the stator may be varied by adjusting the field rheostat 33 which governs the field strength of the field winding 32 of the generator 31 of the motor generator set 24. The value of the resistance connected in circuit relation with the rotor of the induction motor 17, when acting as a drag generator, may be accomplished by adjusting the setting of the adjustable bank of resistance units 27. When the proper balance between the direct current excitation and the resistance 27 is determined, then the adjustable rheostat 33 and the bank of resistance units 27 are fixed.

In explaining the operation of my invention, let it be assumed that the switch 39 is closed which energizes the motor 30 of the motor-generator 24 from the pair of conductors 40 and 41 connected across the power conductors 36 and 37, and that the control arm 60 of the segmental controller 28 is in its vertical position as shown in the drawing. In starting my control system, let it be further assumed that it is desired to operate the induction motor 10 as a motor and the induction motor 17 as a drag generator. Under this assumed condition, the operator quickly actuates the control arm 60 to the right and causes the arcuate bridging segment 61 to bridge all of the respective contact segments 62, 63, 64, 65, 66 and 67. Just as soon as the arcuate bridging segment 61 bridges all of the contact segments 62 to 67, inclusive, there are a plurality of circuits established for causing the induction motor 10 to operate as a motor and the induction motor 17 to operate as a drag generator. The establishment of the respective plurality of circuits may be described as follows:

Starting with the connection 76 on the alternating current conductor 40, current flows through the conductor 78 and the control arm 60 to the arcuate bridging segment 61, and thence through the respective segmental contacts 62 to 67, inclusive. The current upon leaving the segmental contact 62 flows through a common return conductor 80 which continues to the connection 77 on the alternating current conductor 41. The closing of the group of three contactors 43 impresses three phase excitation upon the stator 11 of the induction motor 10 from the three power conductors 36, 37 and 38. The current upon leaving the segmental contact 62 also flows through a conductor 81 to energize the coil of the contactor 44 and from there the current flows through the common return conductor 80 to the connection 77. The closing of the group of three contactors 44 connects the rotor 12 of the induction motor 10 in circuit relation with the plurality of groups of resistance units 26. The current upon leaving the segmental contacts 62 likewise flows through a conductor 82 which branches off through the conductors 83 and 84 to energize respectively the coils of the contactors 45 and 46, and from these two coils the current flows through the common return conductor 80 to the connection 77. The closing of the group of two contactors 45 impresses direct current excitation upon the stator winding of the induction motor 17 acting as a drag generator. The closing of the group of three contactors 46 connects the rotor of the induction motor 17, acting as a drag generator, in circuit connection with the bank of resistance units 27.

The segmental contacts 63 and 67, inclusive, and the segmental contacts 69 and 73 inclusive, are connected together as illustrated in the drawing, and thus when the control arm 60 is actuated to the right, the current upon leaving the contact segments 63 flow through the contact segment 69 and thence through a conductor 85 for energizing the coil of the contactor 56 and from there the current flows through the common return conductor 80 to the connection 77. The current upon leaving the segmental contact 64 flows through the segmental contacts 70 and a conductor 86 to energize the coil of the contactor 55 and from there the current flows through the common return conductor 80 to the connection 77. The current upon leaving the segmental contact 65 flows through the segmental contact 71 and a conductor 87 to energize the coil of the contactor 54 and from there the current flows through the common return conductor 80 to the connection 77. The current upon leaving the segmental contact 66 flows through the segmental contact 72 and a conductor 88 for energizing the coil of the contactor 53 and from there the current flows through the common return conductor 80 to the connection 77. The current upon leaving the segmental contact 67 flows through the segmental contact 73 and a conductor 89 for energizing the coil of the contactor 52 and from there the current flows through the common return conductor 80 to the connection 77. Therefore, when the control arm 60 is actuated to the right, causing the arcuate bridging segment 61 to bridge all of the segmental contacts 62 to 67, inclusive, the induction motor 10 is operating with all of the group of resistance units 26 excluded from the rotor circuit 12, since all of the contactors 52 to 56 are closed.

The speed-torque characteristic of the induction motor 10, operating with all of the resistance units 26 excluded is represented by the curve 102 in Figure 2, and the speed of the motor when all the group of resistances 26 are excluded is determined by the intersection of the curve 102 with the curve 101. Let it be assumed for the purpose of simplicity that when the reel 13 is empty the effective diameter is one-half of what it will be when the reel 13 is full, which means that the value of the torque required to rotate the empty reel is one-half of that required to operate the full reel. Thus, in Figure 2, the curve 101 also represents the increasing driving torque required to drive the reel 13 as it increases in effective diameter, as the speed decreases. Therefore, in order to provide for an increase in the torque and a reduction in the speed of the induction motor 10, when acting as a motor, I provide for inserting step-by-step the several groups of resistance units 26 in the rotor circuit of the induction motor 10. In actual practice, when the operator observes, after the motor 10 has been operating for a period of time, that the travel of the material 22 increases slightly above its normal transfer speed, he actuates the control arm 60 to the left to unbridge the contact segments 67 which causes the contactor 52 to open and insert the first banks of resistance units 26 in the rotor circuit 12 of the induction motor 10. The speed-torque characteristics of the induction motor 10 with the first banks of resistance units 26 in the rotor circuit may be designated by the curve 103. The introduction of the first bank of resistance units 26 in the rotor circuit 12 causes the speed to reduce at a value determined where the curve 103 intercepts the curve 101. The operator allows the motor to operate under this condition for a period of time until the travel of material 22 increases slightly beyond its normal value and then he de-notches to the left to unbridge the segmental contact 66, which opens the contactor 53 and inserts the first two banks of resistance units 26 in the rotor circuit 12. The speed-torque characteristic of the induction motor 10 with two banks of resistance units 26 inserted into the rotor circuit 12 may be represented by the curve 104. Therefore, the speed of the induction motor 10 is decreased to an amount determined where the curve 104 intercepts the curve 101. The operator continues to de-notch the arcuate bridging segment 61 to the left until all of the contact segments 67 to 63 are unbridged, step-by-step, introducing the group of resistance units 26 into the rotor circuit 12 of the induction motor 10, producing respectively the torque-speed characteristic curves 105, 106, and 107. The speed of the induction motor accordingly is decreased, step-by-step to values determined by the intersection of the curves 105, 106 and 107 with the curve 101.

The tension of the material 22 is maintained substantially constant, as determined by the braking-torque characteristic of the induction motor 17, acting as a drag generator, which is substantially inversely proportional to the speed of the reel 20.

When the material 22 is transferred to the reel 13, the process is reversed and the induction motor 17 is operated as a motor, and the induction motor 10 is operated as a drag generator. To take care of this reverse operation, the segmental controller 28 is actuated to the left, in which case the sequence of the control is the same as that described with reference to the control when the control arm 60 is actuated to the right. When the arcuate bridging segment 61 bridges all of the contacts 68 to 73, inclusive, the current upon leaving the contact 68 flows through a conductor 90 which branches into the two conductors 91 and 92 for energizing respectively the two coils of a contactor 48 and 47 and from there the current flows through the common return conductor 80 to the connection 77. The closing of the group of three contactors 47 impresses three phase excitation upon the stator of the induction motor 17 from the supply conductors 36, 37 and 38. The closing of the group of three contactors 48 connects the rotor 19 of induction motor 17 in circuit relation with the bank of resistance unit 26. The current upon leaving the segmental contact 68 also flows through a conductor 93 which branches off into the conductor 94 and 95 to energize respectively the coils of the contactors 46 and 50 and from there the current flows through the common return conductor 80 to the connection 77. The closing of the group of three contactors 49 connects the bank of resistance units 27 in circuit relation with the rotor 12 of the induction motor 10 and the closing of the group of two contactors 50 impresses direct current excitation upon stator windings 11 of the induction motor 10. The denotching of the control arm 60 to the right to insert step-by-step the successive banks of resistance units 26 in the rotor circuit of the induction motor 17 is the same as that previously described, when the motor 10 was acting as a motor and the induction motor 17 was acting as a drag generator.

Therefore, from the above description, it is observed that I have provided for reversibly operating a pair of induction motors as a motor and as a drag generator, and as a drag generator and a motor, respectively, and for causing the drag generator to produce a brake-torque characteristic which varies approximately inversely with the speed of the unwinding reel to maintain a substantially uniform tension upon the material being unwound for causing the induction motor when acting as a motor to decrease its speed as the driving torque increases resulting from an increase in the effective diameter of the winding reel.

In the practice of my invention, the induction motors may be of the slip-ring induction type or of the squirrel-cage induction type. In the present application, I have shown and described my invention with reference to the slip-ring type, but a squirrel-cage type may be employed by selecting the proper value of fixed resistance in the squirrel-cage rotor windings and balancing the selected value with the direct current excitation to produce the required braking-torque characteristic.

While I have shown a motor-generator set as the means for providing the direct current excitation, it is understood that my invention includes other means of providing direct current excitation, such, for example, as a rectifier arrangement, a battery; or a condenser across two of the three terminals of the polyphase induction motor acting as the drag generator.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In combination with a source of direct current and of alternating current, of a control system for unwinding material from either of two rotatively mounted rolls and winding same upon the other comprising, a first induction motor having a stator and a rotor connected to one of said rolls, a second induction motor having a stator and a rotor connected to the other said roll, a first resistance means, a second resistance means, controlling means comprising first control means for operating the first induction motor as a motor and the second induction motor as a drag generator to unwind the material from one of said rolls and winding same upon the other roll and second control means for operating the second induction motor as a motor and the first induction motor as a drag generator to unwind the material from the latter of said rolls and wind same upon the former roll, said first control means comprising a plurality of switch means, one said switch means connecting the stator of the first induction motor to the source of alternating current, another said switch means connecting the rotor of the first induction motor to the first resistance means, another said switch means connecting the stator of the second induction motor to the source of direct current and another of said switch means connecting the rotor of the second induction motor to the second resistance means, said second control means comprising a plurality of switch means, one said switch means connecting the stator of the second induction motor to the source of alternating current, another said switch means connecting the rotor of the second induction motor to the first resistance means, another said switch means connecting the stator of the first induction motor to the source of direct current and another said switch means connecting the rotor of the first induction motor to the second resistance means, means for selecting the direct current excitation of the stator of the induction motor acting as a drag generator with the value of the second resistance means to cause the induction motor acting as a drag generator to produce a braking torque characteristic which varies approximately inversely with the speed of the unwinding roll to maintain substantially uniform tension on the material being unwound, and means for varying the value of the first resistance means to reduce the speed of the induction motor acting as a motor to transfer the material to the winding roll at a substantially constant lineal speed.

2. In combination with a source of direct current and of alternating current, of a control system for unwinding material from an unwinding roll and winding same upon a winding roll comprising, a first induction motor having a stator and a rotor connected to the winding roll, a second induction motor having a stator and a rotor connected to the unwinding roll, a first resistance means, a second resistance means, controlling means for operating the first induction motor as a motor and the second induction motor as a drag generator to unwind the material from the unwinding roll and wind same upon the winding roll, said controlling means comprising a plurality of switch means, one said switch means connecting the stator of the first induction motor to the source of alternating current, another said switch means connecting the rotor of the first induction motor to the first resistance means, another said switch means connecting the stator of the second induction motor to the source of direct current and another of said switch means connecting the rotor of the second induction motor to the second resistance means, means for selecting the direct current excitation of the stator of the induction motor acting as a drag generator with the value of the second resistance means to cause the induction motor acting as a drag generator to produce a braking torque characteristic which varies approximately inversely with the speed of the unwinding roll to maintain substantially uniform tension on the material being unwound, and means for varying the value of the first resistance means to reduce the speed of the induction motor acting as a motor to transfer the material to the winding roll at a substantially constant lineal speed.

3. The method of unwinding material from an unwinding roll and winding same upon a winding roll at a substantially constant transfer lineal speed and at a substantially constant tension comprising, driving the winding roll by an induction motor having a stator and a rotor circuit, exciting the stator of the induction motor by alternating current and establishing a minimum of resistance in the rotor circuit, increasingly introducing resistance in the rotor circuit and reducing the speed of the winding roll substantially in accordance with the increasing effective diameter of the winding roll to transfer the material at substantially a constant transfer lineal speed, opposing the rotation of the unwinding roll by an induction motor having a stator and a rotor with resistance, exciting the stator of the second induction motor by direct current to cause the second induction motor to act as a drag generator, selecting the direct current excitation with the value of the rotor resistance of the second induction motor to produce a braking torque characteristic which varies approximately inversely with the increasing speed of the unwinding roll to maintain a substantially uniform tension on the material being unwound.

4. The method of unwinding material from an unwinding roll and winding same upon a winding roll at a substantially constant transfer lineal speed and at a substantially constant tension comprising, driving the winding roll by an induction motor having a stator and a rotor circuit, exciting the stator of the induction motor by alternating current and establishing a minimum of resistance in the rotor circuit, increasingly introducing resistance in the rotor circuit and reducing the speed of the winding roll substantially in accordance with the increasing effective diameter of the winding roll to transfer the material at substantially a constant transfer lineal speed, opposing the rotation of the unwinding roll by an induction motor having a stator and a rotor with resistance, exciting the stator of the second induction motor by direct current to cause the second induction motor to act as a drag generator, selecting the direct current excitation with the value of the rotor resistance of the second induction motor to produce a braking speed-torque characteristic curve which is substantially parallel to the driving speed-torque characteristic curve of the induction motor driving the winding roll.

5. The method of unwinding material from an unwinding roll and winding same upon a winding roll at a substantially constant transfer lineal speed and at a substantially constant tension comprising, driving the winding roll at a decreasing speed substantially in accordance with the increasing effective diameter of the winding roll to transfer the material at substantially a constant transfer lineal speed, opposing the rotation of the unwinding roll by an induction motor having a stator and a rotor with resistance, exciting the stator of the induction motor by direct current to cause the induction motor to act as a drag generator, selecting the direct current excitation with the value of the rotor resistance of the induction motor to produce a braking torque characteristic which varies approximately inversely with the increasing speed of the unwinding roll to maintain a substantially uniform tension on the material being unwound.

RICHARD A. GEUDER.